United States Patent
Lewis et al.

(10) Patent No.: US 10,452,241 B2
(45) Date of Patent: Oct. 22, 2019

(54) CONTINUATION OF PLAYBACK OF MEDIA CONTENT BY DIFFERENT OUTPUT DEVICES

(71) Applicant: Google LLC, Mountain View, CA (US)

(72) Inventors: Justin Lewis, Marina del Rey, CA (US); Ruxandra Georgiana Davies, Santa Monica, CA (US)

(73) Assignee: Google LLC, Mountain View, CA (US)

( * ) Notice: Subject to any disclaimer, the term of this patent is extended or adjusted under 35 U.S.C. 154(b) by 233 days.

(21) Appl. No.: 15/683,669

(22) Filed: Aug. 22, 2017

(65) Prior Publication Data

US 2017/0351409 A1 Dec. 7, 2017

Related U.S. Application Data

(63) Continuation of application No. 14/488,260, filed on Sep. 16, 2014, now Pat. No. 9,747,011.

(51) Int. Cl.
*G06F 3/048* (2013.01)
*G06F 3/0484* (2013.01)
*H04L 29/06* (2006.01)
*G06F 3/01* (2006.01)
*G06F 16/487* (2019.01)

(52) U.S. Cl.
CPC .......... *G06F 3/04842* (2013.01); *G06F 3/011* (2013.01); *G06F 16/487* (2019.01); *H04L 65/60* (2013.01)

(58) Field of Classification Search
CPC ........ G06F 3/048; G06F 16/487; G06F 3/011; H04L 65/60
USPC .......................................................... 715/716
See application file for complete search history.

(56) References Cited

U.S. PATENT DOCUMENTS

| 7,383,983 | B2 | 6/2008 | Gaumond et al. |
| 8,028,081 | B2 | 9/2011 | Kandekar et al. |
| 8,614,625 | B2 | 12/2013 | Alsina et al. |
| 8,750,677 | B2 | 6/2014 | Brown et al. |

(Continued)

FOREIGN PATENT DOCUMENTS

EP 2582146 A1 4/2013

OTHER PUBLICATIONS

Examination Report dated Feb. 20, 2019 in EP Patent Application No. 15764024.4.

(Continued)

*Primary Examiner* — David Phantana-angkool
(74) *Attorney, Agent, or Firm* — Byrne Poh LLP

(57) ABSTRACT

Implementations relate to continuation of playback of media content by different devices. In some implementations, a method includes causing a stream of media content data to be received from a stream source and output by a first device to a user, where a portion of the data is buffered on the first device before output. An indication is detected that the user has stopped using the first device for output of the content data. A place marker indicates a portion of the content that is output approximately at the time of the indication. The method causes the stream of content data to be received and output by a second device starting at the place marker portion. The buffered content data is sent from the first device to the second device for output by the second device before unbuffered portions of the content data received from the stream source.

20 Claims, 6 Drawing Sheets

(56) References Cited

U.S. PATENT DOCUMENTS

| | | | |
|---|---|---|---|
| 9,118,934 B2 | 8/2015 | Breau et al. | |
| 9,137,281 B2 | 9/2015 | Warrick et al. | |
| 9,195,383 B2 | 11/2015 | Garmark et al. | |
| 9,253,531 B2* | 2/2016 | Relyea | H04N 21/4126 |
| 9,357,154 B2* | 5/2016 | Chen | H04N 5/44543 |
| 9,906,610 B1* | 2/2018 | Foster | H04L 65/4023 |
| 2011/0320626 A1 | 12/2011 | Wong et al. | |
| 2014/0108929 A1 | 4/2014 | Garmark et al. | |
| 2015/0058728 A1 | 2/2015 | Haggerty | |
| 2019/0007745 A1* | 1/2019 | Lewis | H04N 21/4882 |

OTHER PUBLICATIONS

Cui, et al., "Seamless User-Level Handoff in Ubiquitous Multimedia Service Delivery", Multimedia Tools and Applications, Kluwer Academic Publishers, vol. 22, No. 2, Feb. 1, 2004, pp. 137-170.

D'Orazio, "Spotify Connect Lets You Control and Play Music from Any Device", The Verge; http://www.theverge.com/2013/9/3/4688166/spotify-connect-launches-to-stream-music-to-compatible-speakers, Sep. 3, 2013, 3 pages.

European Patent Office, Written Opinion for International Patent Application No. PCT/US2015/048144, dated Jan. 28, 2016, 11 pages.

European Patent Office, International Search Report for International Patent Application No. PCT/US2015/048144, dated Jan. 28, 2016, 6 pages.

International Bureau of WIPO, International Preliminary Report on Patentability for International Patent Application No. PCT/US2015/048144, dated Mar. 21, 2017, 11 pages.

Rawashdeh, et al., "Seamless Video Handoff in Session Mobility Over the IMS Network", World of Wireless, Mobile and Multimedia Networks & Workshops, IEEE International Symposium on a, IEEE, Jun. 15, 2009, pp. 1-6.

USPTO, Notice of Allowance for U.S. Appl. No. 14/488,260, dated Apr. 24, 2017, 16 pages.

USPTO, First Action Interview, Pre-Interview Communication for U.S. Appl. No. 14/488,260, dated Nov. 18, 2016, 5 pages.

Mingqiang, et al., "Buffer Handling Media Attribute in Session Description Protocol (SDP) for Seamless Session Mobility", JCT-VC Meeting, Geneva, Mar. 31, 2005, 15 pages.

* cited by examiner

CONTINUATION OF PLAYBACK OF MEDIA CONTENT BY DIFFERENT OUTPUT DEVICES

CROSS-REFERENCE TO RELATED APPLICATIONS

This application is a continuation of U.S. patent application Ser. No. 14/488,260, filed Sep. 16, 2014 and titled CONTINUATION OF PLAYBACK OF MEDIA CONTENT BY DIFFERENT OUTPUT DEVICES, the entirety of which is incorporated herein by this reference thereto.

BACKGROUND

The popularity and convenience of digital devices have caused the playing of media content to become ubiquitous. For example, users of desktop computers, laptop computers, large-screen televisions, and similar devices can experience media content of various types. Similarly, users of cell phones, tablet computers, personal digital assistants, and wearable devices (watches, goggles or glasses, etc.) can carry or wear these devices with them to experience media content in practically any setting. The various forms of media content playable on devices can include video, audio, images, games, text, and combinations of these, which can be output on display screens, audio speakers, and other output components of the devices. In various cases, devices can play the media content from local storage on the device, such as Flash memory, DVDs, etc. In other cases, devices can output media content based on a stream of data received from a server that is connected to the devices over a network such as the Internet.

SUMMARY

Implementations of the present application relate to continuation of playback of media content by different output devices. In some implementations, a method includes causing a stream of media content data to be received by a first device from a stream source and output by the first device to a user, where a portion of the stream of media content data is buffered on the first device before being output. An indication is detected that the user has stopped using the first device for output of the stream of media content data. The method determines a place marker for the media content data indicating a portion of the media content data that is output approximately at the time of the indication. The method causes the stream of media content data to be received and output by a second device, where the output starts at the portion of the stream of media content data indicated by the place marker. The buffered portion of the media content data on the first device is sent from the first device to the second device for output by the second device before output of an unbuffered portion of the stream of media content data received by the second device from the stream source.

Various implementations and examples of the method are described. For example, the stream of media content data can be received by the first device and by the second device over the Internet from one or more servers as the stream source. The buffered portion of the stream of media content data can be sent to the second device over a network local to the first device and the second device. Detecting an indication that the user has stopped using the first device for output can include detecting that the user has physically moved outside a predetermined area of the first device. For example, detecting that the user has physically moved can include using a sound detection system including one or more components on the first device and one or more components on a device on the person of the user, and/or detecting an unpairing of the first device with a device on the person of the user. In more examples, detecting an indication that the user has stopped using the first device for output can include detecting that the user has physically moved into a predetermined area of the second device from a location outside the predetermined area, and/or that the user has performed an action to cause the first device to stop outputting the stream of media content data.

In some implementations, the first device is not located on the person of the user and the second device is a portable device located on the person of the user. In some implementations, the first device and the second device are not located on the person of the user. The method can include causing a notification to be sent to the second device such that the notification is output by the second device and provides a continue option selectable by the user, where the sending of the buffered portion and the output of the stream of media content data by the second device can be performed in response to the user selecting the continue option. The method can include causing the notification to be sent to an intermediary device, e.g., a device on the person of the user, where the notification is output by the intermediary device and provides a continue option selectable by the user, and the output of the stream of media content data by the second device is performed in response to the user selecting the continue option.

The method can further include causing information to be sent to the second device over a network including the place marker and a command to start outputting the media content by the second device continuing from the place indicated by the place marker. The output can be provided on the second device without the user logging into a user account of a media service using the second device and without the user navigating a user interface to select the media content data on the different device.

A method includes, in some implementations, causing a stream of media content data to be received by a first device over a network from a stream source and output by the first device, where a portion of the stream of media content is continually buffered on the first device before being output, and the output media content data is associated with a user using the first device. The method detects that the user has physically moved relative to the first device so as to indicate that the user no longer desires to continue to experience output from the first device. The method determines a place marker for the media content indicating a portion of the media content data that is output approximately at the time of the detection, and causes a notification to be sent to a second device being used by the user, where the notification is output by the second device and provides a continue option selectable by the user. The method causes the buffered portion of the media content to be sent from the first device to the second device over a local network local to the first device and the second device, and causes an unbuffered portion of the stream of media content data that follows the buffered portion to be received by the second device from the stream source over the network. In response to the user selecting the continue option, the method causes output of the stream of media content data by the second device, where the second device starts the output of the media content at the portion of the media content indicated by the place marker, and the buffered portion of the media content data is output by the second device before output of the unbuffered portion of the stream of media content data.

In some implementations, a system can include a storage device and at least one processor accessing the storage device and operative to perform operations. The operations include causing a stream of media content data to be received by a first device from a stream source and output by the first device to a user, where a portion of the stream of media content data is buffered on the first device before being output. An indication is detected that the user has stopped using the first device for output of the stream of media content data. The operations determine a place marker for the media content data indicating a portion of the media content data that is output approximately at the time of the indication. The operations cause the stream of media content data to be received and output by a second device, where the output starts at the portion of the stream of media content data indicated by the place marker. The buffered portion of the media content data on the first device is sent from the first device to the second device for output by the second device before output of an unbuffered portion of the stream of media content data received by the second device from the stream source.

In various implementations of the system, the stream of media content data can be received by the first device and by the second device over the Internet from one or more servers as the stream source, where the buffered portion of the stream of media content data can be sent to the second device over a local network local to the first device and the second device. The operation of detecting an indication that the user no longer desires to experience output from the first device can include detecting that the user has physically moved outside a predetermined area of the first device, and/or detecting that the user has physically moved into a predetermined area of the second device from a location outside the predetermined area of the second device.

In some implementations of the system, the first device is not located on the person of the user and the second device is a portable device located on the person of the user, and the operations further include causing a notification to be sent to the second device, where the notification is output by the second device and provides a continue option selectable by the user, and the sending of the buffered portion of the media content data from the first device to the second device and the output of the stream of media content data by the second device are performed in response to the user selecting the continue option. In some implementations, the first device and the second device are not located on the person of the user, and the operations further include causing a notification to be sent to an intermediary device on the person of the user, where the notification is output by the intermediary device and provides a continue option selectable by the user, and the output of the stream of media content data by the second device is performed in response to the user selecting the continue option.

DETAILED DESCRIPTION

Figure 1:
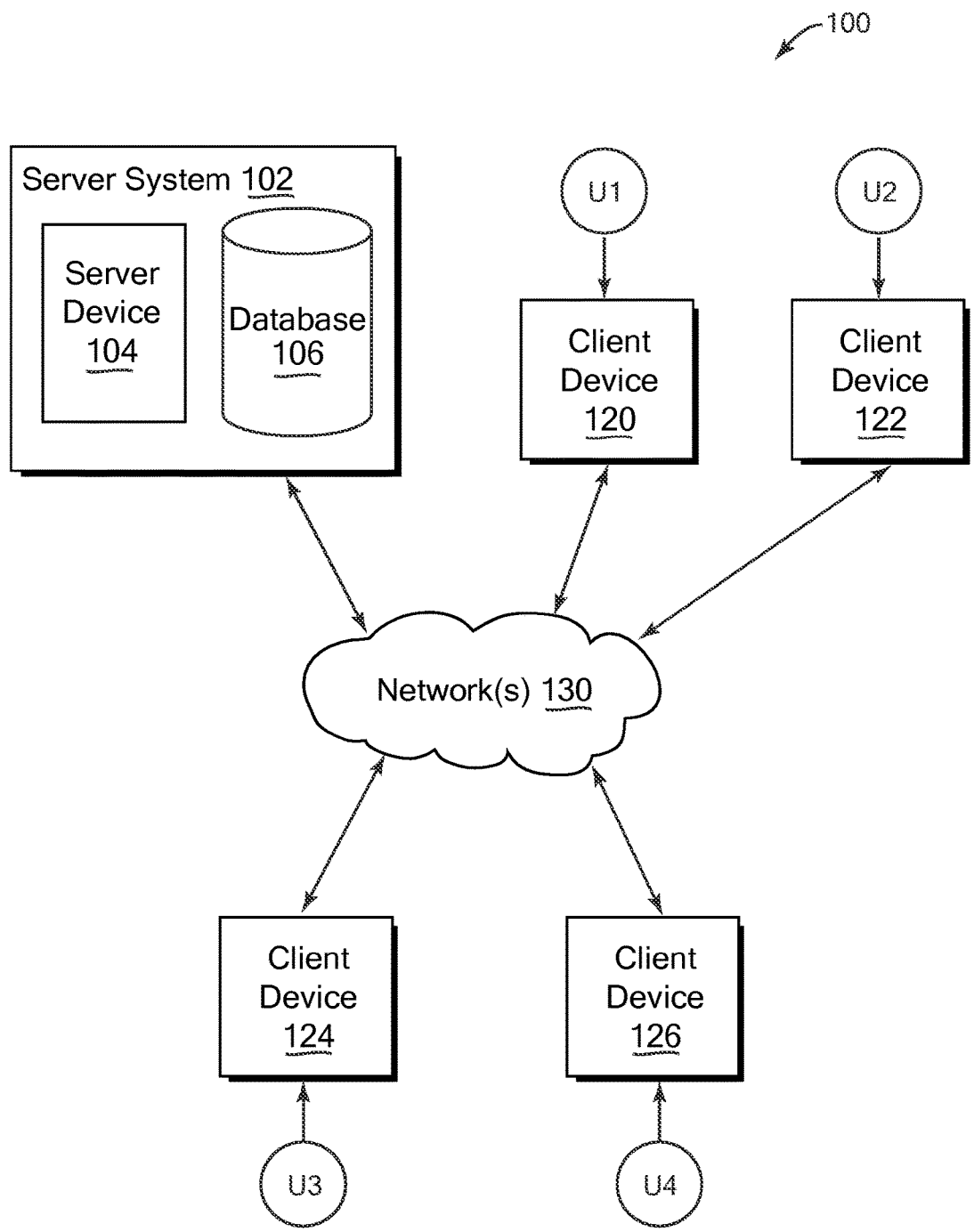
FIG. 1 is a block diagram of an example network environment which may be used for one or more implementations described herein.

One or more implementations described herein relate to continuing playback of media content by different output devices. For example, a first device can receive and output media content to a user watching or otherwise experiencing the content. If the system detects that the user has stopped watching the content or has otherwise stopped using the first device for the playback, then the media content can be automatically transferred to a second, different device where the content output can be continued from the same or similar place it left off on the first device at the time the user stopped using the first device playback.

In some further examples, the first device can receive a stream of media content data from a stream source over the Internet (e.g., video or movie content, music, games, etc.), and can buffer and output the content data to the user. For example, the media content can be output on the display screen and speakers of a television device, computer device or other device. The system can detect in various ways that the user is experiencing the content, such as detecting that the user has commanded playback of the content. In some other implementations, the user can stream the content from a portable device such as a phone to the first device for output.

The system can detect that the user has stopped using the first device and/or stopped experiencing the output media content. In various examples, the system can detect that the first device has been stopped, powered off, and/or no longer receives the stream of media content data. In some cases, the system can detect that the user has physically moved outside a predetermined distance from or area of the first device, where the detection can use any suitable sensor system, including a sound sensor system on the first device and a device carried by the user that uses sound waves (e.g., ultrasonic or subsonic), GPS sensors used on a device carried by the user, etc. In some cases, the system can detect an unpairing of the first device with a device on the person of the user, such as a phone that was used to command the first device and/or stream the content data to the first device. In some cases, the system can detect that the user has physically moved within a predetermined distance of a different or second device which can be used to output the media content.

If system detects that the user has stopped experiencing the media content, the system stores a place marker for the media content approximately indicating a portion of the media content that was last output to the user. The system then, automatically and without user intervention, sends the content data to a second device being used by the user, allowing the user to continue output of the media content on the second device, and the media content starts playing from the same place it left off as indicated by the place marker.

In some examples, the system can continue the output of the media content data on the second device in response to particular conditions. For example, if the user moves within a predetermined distance of the second device, then the system detects this proximity to continue the output on the second device. In some cases, the system can first send a notification that is displayed by the second device to the user that indicates descriptive information about the media content and provides a button or link that, when selected by the user, commands the playback of the content on the second device. In some examples, the second device can be a portable phone or other device on the person of the user, such that the media content is output by the portable device. In other examples, the second device can be a device not on the person of the user, such as a TV, computer, etc., which starts playing the media content automatically (e.g., if the user is within range of the second device) and/or in response to the user selecting a notification command on the second device or on a different device. In some examples, an intermediary device, different than the second device, can be used to enable the continuation of the content output on the second device. For example, in some implementations a phone or other portable device on the person of the user can be the intermediary device that receives the notification displayed to the user and allows the user to command the output of the content on the second device such as a TV, computer, etc.

Some implementations can cause the first device to send buffered content data to the second device for output on the second device. For example, the first device can maintain an output buffer during its output of the content data, and can automatically send buffered medic content data to the second device over a local network (e.g., Wi-Fi and/or Ethernet) in response to the continuation of output selected for the second device, thus providing a fast and smooth continuation of the output content data for the second device. Any remaining content data in the stream after the buffered data can be received by the second device from a stream source over the Internet, for example.

These and other described features can allow a user to conveniently continue to experience media content on different devices automatically as the user uses different devices and/or as the user moves to locations where other devices are available to play the content. The continuation of output of media content is performed on the second device without the user having to log in to the second device, log into a user account of a media service using the second device, or navigate a user interface displayed by the second device (or other device) to select the media content for output on the second device. Thus, a technical effect of continuing media content playback on different devices as disclosed herein include a reduction in user actions to enable such continuation of content playback, thus saving a user time, energy, and resources in experiencing media content in a flexible manner between various devices. Another technical effect can include a smoother and faster transition of continuing playback on a different device based on buffered data received on the second device from the first device over a fast transmission mechanism such as a local network.

References to "media content" herein indicate information expressed through various types of information, such as visual images composed of pixels, video (movies, television episode, shorts, clips, etc.), audio (e.g., music, voice recordings, soundtrack to accompanied other content, sound excerpts from a video source, etc.), games (e.g., a video game, a recording of game play, or other game-related information), software application output (displayed diagrams or drawings, graphical presentations, interactive presentations or slideshows, etc.), text (books, magazines, papers, letters, etc.), or a mixture of two or more of these types. A "work" of content refers to a complete and self-contained work or piece of content or collection of works, such as a movie, a song, a music album, a news article, a magazine, a game, a book, etc. Output of media content can be obtained using visual devices such as display screens, audio devices such as audio player devices and speakers, force output devices such as motors or other actuators, etc.

FIG. 1 illustrates a block diagram of an example network environment 100, which may be used in some implementations described herein. In some implementations, network environment 100 includes one or more server systems, such as server system 102 in the example of FIG. 1. Server system 102 can communicate with one or more networks 130, for example. Server system 102 can include a server device 104 and a database 106 or other storage device. Network environment 100 also can include one or more client devices, such as client devices 120, 122, 124, and 126, which may communicate with each other via network(s) 130 and/or server system 102.

Networks 130 can include any types of communication networks. For example, networks 130 can include the Internet or other wide area network (WAN), such that server system 102 can communicate with other devices connected to the Internet. One or more of client devices 120, 122, 124, and 126 can also be connected to the Internet in networks 130 to communicate with server system 102 and/or other client devices 120-126. In some implementations, server system 102 and/or client devices 120-126 are connected to one or more local networks of networks 130, such as local area networks (LANs), including wireless local-networks such as Wi-Fi (e.g., using IEEE standard 802.11), peer-to-peer networks (Bluetooth®, Wi-Fi Direct, etc.), etc. For example, a client device can connect to a local area network which in turn connects to the Internet, which connects to server system 102. In other implementations, server or client devices can be connected to the Internet via other networks, such as a phone network, wireless cell phone network, wireless cell phone data network, etc. In some examples, client devices 120-126 that are both connected to the same local network can communicate with each other over that local network without having to communicate over the Internet. Any of the various networks in networks 130 can include wired and wireless networks, switches, routers, hub connections, etc.

For ease of illustration, FIG. 1 shows one block for server system 102, server device 104, and database 106, and shows four blocks for client devices 120, 122, 124, and 126. Server blocks 102, 104, and 106 may represent multiple systems, server devices, and network databases, and the blocks can be provided in different configurations than shown. For example, server system 102 can represent multiple server systems that can communicate with other server systems via the network 130. In another example, database 106 and/or other storage devices can be provided in server system block(s) that are separate from server device 104 and can communicate with server device 104 and other server systems via network 130. Also, there may be any number of client devices. Each client device can be any type of electronic device, such as a computer system, laptop computer, portable device, cell phone, smart phone, tablet computer, television, TV set top box or entertainment device, wearable devices (e.g., display glasses or goggles, wristwatch, etc.), personal digital assistant (PDA), media player, game console or device, etc. In other implementations, network environment 100 may not have all of the components shown and/or may have other elements including other types of elements instead of, or in addition to, those described herein.

In various implementations, end-users U1, U2, U3, and U4 may communicate with the server system 102 and/or each other using respective client devices 120, 122, 124, and 126. In some examples, users U1-U4 may interact with each other via a network service implemented on server system 102, such as a social network service, message service, web site, or other service, where respective client devices 120, 122, 124, and 126 transmit communications and data to one or more server systems such as system 102, and the server system 102 provides appropriate data to the client devices such that each client device can receive content uploaded to the network service via the server system 102. In some examples, a social network service can include any system allowing users to perform a variety of communications, form links and associations with other users, organize groups of users, upload and post shared content including text, images, video sequences, audio sequences or recordings, or other types of content for access by designated groups of users of the social network service, and/or perform other socially-related functions.

A user interface can enable display of images and other content as well as communications, privacy settings, notifications, and other data on a client device 120, 122, 124, and 126. In some implementations, such an interface can be displayed using software on the client device, such as application software or client software in communication with the server system. The interface can be displayed on an output device of a client device, such as a display screen.

Other implementations of features described herein can use any type of system and service. For example, any type of electronic device can make use of features described herein. Some implementations can provide these features on client or server systems intermittently connected to computer networks. In some examples, a client device having a display screen can display images and provide features and results as described herein that are viewable to a user.

Figure 2:
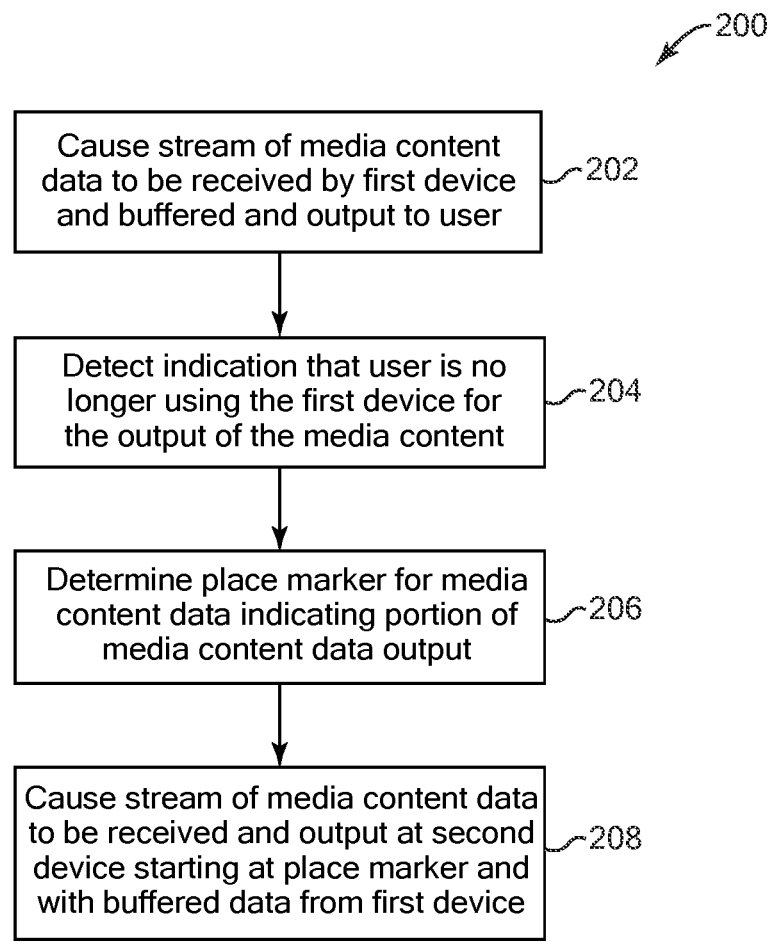
FIG. 2 is a flow diagram illustrating an example method for continuing playback of media content by different output devices, according to some implementations.

FIG. 2 is a flow diagram illustrating one example of a method 200 for continuing playback of media content by different output devices. In some implementations, method 200 can be implemented, for example, on a server system 102 as shown in FIG. 1. In other implementations, some or all of the method 200 can be implemented on a system such as one or more client devices, and/or on both a server system and one or more client systems. In described examples, the implementing system includes one or more processors or processing circuitry, and one or more storage devices such as a database 106, memory, and/or other storage. In some implementations, different components of one or more servers and/or clients can perform different blocks or other parts of the method 200.

Method 200 can be implemented by computer program instructions or code, which can be executed on a computer, e.g., implemented by one or more processors, such as microprocessors or other processing circuitry and can be stored on a computer program product including a computer readable medium or computer readable storage medium, such as a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, method 200 can be implemented in hardware (logic gates, etc.), or in a combination of hardware and software.

In some implementations, the method 200 can be implemented on a server system and can control the input and/or output of the media content stream to and from one or more devices, such as the first device, second device, and/or other devices. In some implementations, the method 200 can be implemented partially or completely by one or more client devices, such as one or more of the first device, second device, and/or other devices that output the media content stream and/or communicate information as described herein. Some implementations can implement one or more of the first device, second device, and/or other devices in a server system.

In some implementations, method 200, or portions of the method, can be initiated based on user input. A user may, for example, have selected the initiation of the method 200 from an interface such as an application interface, a social networking interface, or other interface. In other implementations, the method 200 can be initiated automatically by a system. For example, the method 200 (or portions thereof) can be performed based on one or more particular events or conditions such as a user opening an application such as a content viewing application on one or more of the described devices, etc. In some implementations, such conditions can be specified by a user in custom preferences of the user. In some implementations, the method 200 or portions thereof can be performed with guidance by the user. For example, a user can use a user interface to designate or select particular media content to output by a device such as the first device, or the media content can be selected automatically based on user preferences or particular conditions.

In block 202, the method causes a stream of media content data to be received by a first output device and output to a user of the first device, where the first device is being used by the user for content playback. In some examples, the first device can be a client device as described above. In various examples, the first media device can be any electronic device able to output media content, including devices that have a display screen that outputs visual media content (e.g., videos, images, etc.), audio speakers or other audio output devices that output audio media content (e.g., music, voice recording, soundtrack of a video, etc.), and/or other output components (e.g., motors or other actuators for force output, etc.). The method can cause the stream of data to be sent based on use of the first device by the user, which can be determined by any of a variety of techniques. For example, the method can receive indications of user commands manipulating the output of the media content (e.g., start, stop, rewind, fast forward, or pause playback of media content, etc.), and/or can sense the user's location relative to the first device that indicates use of the first device by the user in some implementations. The stream of media content data can be sent to the first device over a network, e.g., the Internet, from a stream source such as a server that provides the media content data. The first device can buffer the received data in its local storage (e.g., memory or other storage devices) before that data is output (e.g., played back) from the first device. Examples of some of the features are described in greater detail below with respect to FIGS. 3 and 4A-4B.

In block 204, the method detects an indication that the user is no longer using the first device for the output (playback) of the media content. For example, the method can detect an indication that the user no longer desires to experience the output of the media content stream from the first device. The indication can take a variety of forms, such as the user commanding the output to stop, the user physically moving his or her location, the media output signal no longer being received by the first device, etc., some examples of which are described in greater detail below with respect to FIGS. 3 and 4A-4C.

In block 206, the method determines a place marker for the media content data that indicates a portion of the media content data that was output by the first device. For example, the place marker can indicate the portion of the content that was output approximately at the time of the indication that the user is no longer using the first device (or approximately at the time of the detection of the indication). In some examples, the place marker can include an indication of the time elapsed for the media content stream with reference to the beginning of the stream of data, or some other indication or place marker.

In block 208, the method causes the stream of media content data to be received and output to the user by a second output device, where the output starts at the place marker in the media content stream and starts the output with a buffered portion of the media content data that is received from the first device. For example, the second device can be a portable device on the user's person, or can be a device not on the user's person. Some implementations can use an intermediary device to receive notifications and/or control the sending of the media content stream to the second device. Furthermore, in some implementations the media content stream is sent to the second device in response to detecting that the user is using the second device. The buffered portion of the steam of media content can be send by the first device to the second device over a local network in some implementations, thereby smoothing the transition of playback from the first device to the second device. Some implementations, features and examples are described in greater detail below with respect to FIGS. 3 and 4A-4C.

Figure 3:
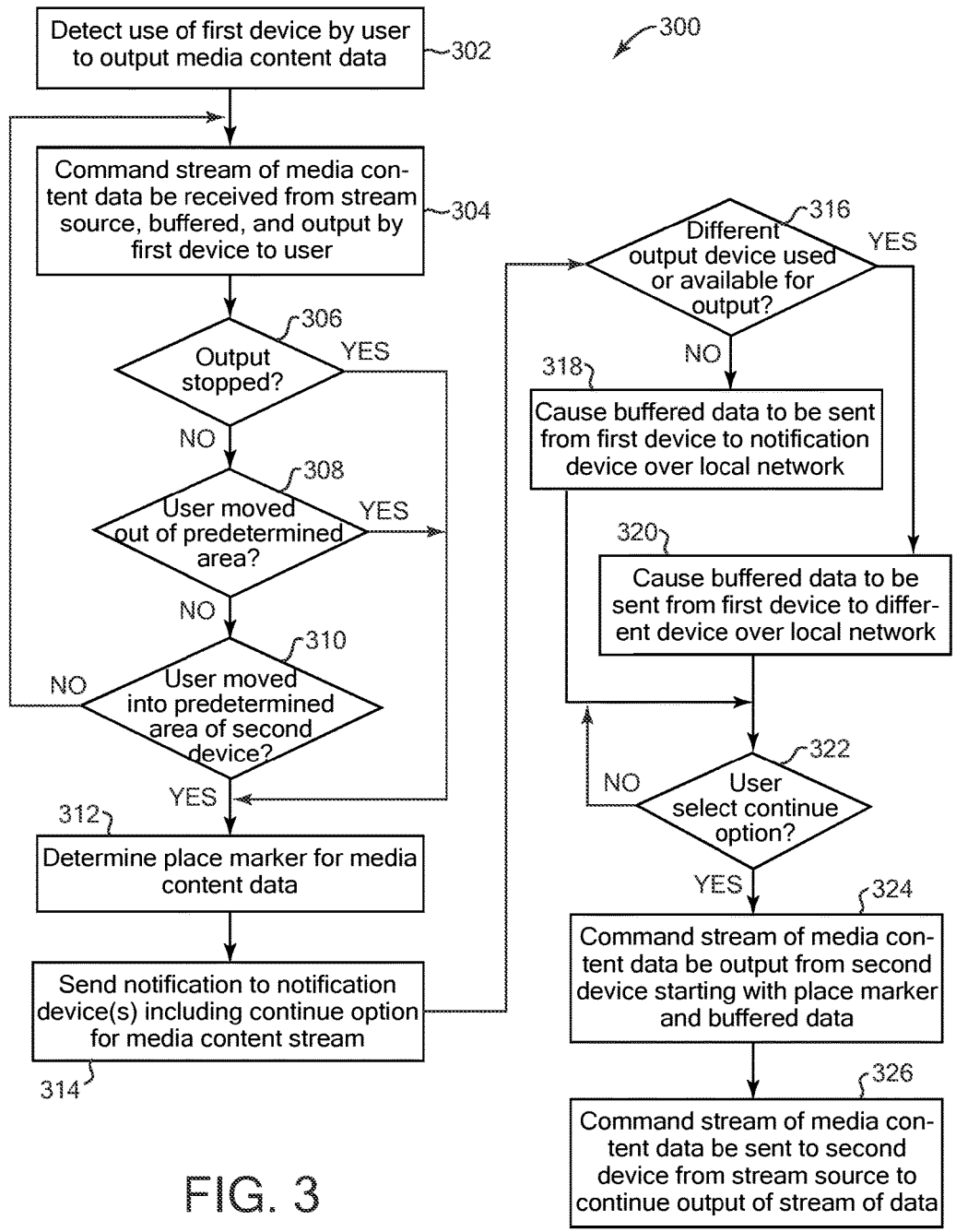
FIG. 3 is a flow diagram illustrating another example method for continuing playback of media content by different output devices, according to some implementations.

FIG. 3 is a flow diagram illustrating another example of a method 300 for continuing playback of media content on different output devices. Method 300 can be implemented by system(s) similarly as described above for method 200.

In block 302, the method detects use of a first output device by a user to output media content data. For example, the media content data can be associated with a user using the first device, e.g., selected by the user to be played. The first media device can be any electronic device able to output media content, similarly as described above for block 202 of FIG. 2. For example, in some implementations the first device can be a device not located on the person of the user (e.g., not carried or worn), such as a television or display screen, laptop computer, desktop computer, game device, set top box connected to a display screen, etc. Other implementations or cases can use a portable device as the first device, such as a cell phone, table computer, wearable device, etc., which may or may not be on the person of the user.

The method can detect use of the first device by any of a variety of techniques. In one example, the method can receive indications of user commands that have manipulated the functions, applications, or output of the first device, such as commands to start, stop, rewind, fast forward, or pause playback of media content in a viewing application, etc. For example, such commands can be received by the first output device to command the output, and can be relayed to a server from the first device. In some implementations, such commands can be sent by the user manipulating another device, e.g., a portable device such as a cell phone, tablet computer, laptop computer, wearable device, etc., or a dedicated device operative to control the first device, such as a remote control. In some implementations, the method can detect that the user is using the first device by sensing the user's location relative to the first device. For example, some implementations or modes of operation can assume the user is using the first device if the user is within a predetermined area of the first device, and/or has provided one or more commands to the first device. Some example implementations of sensor systems that can be used to detect the user's location are described below.

In block 304, the method commands that a stream of media content data be sent from a stream source to the first device (or the method detects that such a stream is being sent), such that the first device receives, buffers, and outputs the stream of media content data to the user. For example, the stream source can send the content data over a network such as the Internet. In some examples, the stream source can be a server, e.g., server system 102 of FIG. 1, that stores and provides the media content data to various devices over a network such as the Internet. The first device can, in various implementations, receive the data from the Internet and over a local network that connects the first device to the Internet, such as a wireless local network (e.g., Wi-Fi®) or local wired network (Ethernet, etc.). In some implementations, the first device can receive the stream of media data over a network such as a cellular wireless network or phone network. In still other implementations, the first device can receive the stream of media content data from a different device that is the stream source, such as a local device connected via a local network, or a portable device carried by the user and connected over a local network such as a wireless local network (e.g., Wi-Fi) or peer-to-peer network between the devices (e.g., Wi-Fi Direct, Bluetooth, etc.).

The first device can buffer a portion of the received stream of media content data in local storage (e.g., memory or other storage devices) before that portion of data is output from the first device. In one example, the first device can fill the buffer with the stream of data initially until the buffer is full, and then start the output of the stream of data starting with the data first loaded into the buffer and filling in the back of the buffer with newly-received data. For example, this can allow the buffered data to be continuously output to the user despite changes in data transmission rates, thus smoothing the output of the media content during times of lower bandwidth and reduced reception rates of the media content data, if such times occur (e.g., due to network data traffic and congestion or other network disruptions).

One or more of blocks 306, 308, and 310 can be performed in various implementations to determine whether the user is still using the first device for experiencing the output of the stream of media content data, e.g., whether the user still desires to experience the output of the media content data from the first device. In block 306, the method checks whether the output of the media content from the first device has been stopped. For example, the user may have commanded the first device to pause the output, or to stop the output. In some cases, the user may have turned off the first device or put it into a sleep mode or similar mode. In some cases, the user may have switched contexts on the first device to use a different application or window than the media output application or window that was outputting the media content data. For example, the user may have switched the content output to a non-displayed or "minimized" window, or otherwise manipulated functions of the first device causing the content output to no longer be the focus of the user such that the user is providing user input to a different interface item than an interface item that was playing the stream of media content data. In some implementations, the first device can send a signal to the stream source indicating that the output of the content data has been stopped at the first device. In still other cases, the power to the first device may have been removed, e.g., from a power outage or other non-user event. In some other cases, the network signal carrying the stream of media content data may have been interrupted such that the first device no longer is receiving the signal. If the output has been stopped, the method continues to block 312, described below.

If the output has not been stopped, the method continues to block 308 in which the method checks whether the user has physically moved out of a predetermined physical area associated with the first device. The predetermined area is a physical area next to or around the first device, referred to an area "of" a device herein. The predetermined area can be defined differently in various implementations, e.g., based on a sensor system used to detect the user. In one example, the predetermined area can be defined based on where a portable device on the person of the user first becomes unpaired with the first device when moving away from the first device. Other sensor systems may be able to detect a user's location with more accuracy, e.g., a sound system as described below. In such cases, the predetermined area can be an area defined relative to the first device. For example, the area can be a particular circular area having a predetermined radius and having the first device at its center. In another example, the area can be defined by the output field of the first device, e.g., a predetermined distance and area in which the user can reasonably experience the output of the first device. For example, the output field of a television can be defined to be a particular distance from the television screen and within a particular angle range in front of or to the side of the screen from which the screen can be viewed by a user. In some example implementations, a portable device can be assigned an output field having a predefined smaller distance to its screen or other output devices (since its output devices are typically smaller than those of non-portable devices), and the output field can be considered the entire volume around the device rather than a particular angle range based on screen facing, since the device can be easily rotated and moved. The method can check the user movement using any of a variety of techniques and implementations.

In one example, the first device can include or be part of a sensing system that senses particular other components of the sensing system within a predetermined area. For example, a sound detection system can use extrasensory sound signals, such as ultrasonic (or infrasonic/subsonic) sound waves that are outside the standard human range of hearing. In one example, the first device can include a sound emitter that emits an extrasensory sound signal that is picked up by a microphone tuned to the sound on another device such as a portable device on the person of the user (e.g., carried by or worn by the user). Each sound signal can include its own different signature or token to allow multiple such systems to be used in the same area. For example, a server (such as the stream source or other server) can instruct the first device to emit the extrasensory sound signal with a particular token or code embedded within the signal. At the same time, the server can instruct the portable device on the user to listen for a sound signal with the specified token in it. If the portable device detects the sound signal, it can inform the server of the signal and token received. The server then knows that the portable device (and the user carrying/wearing it) is located within a predetermined area of the first device, such as a known transmission distance or radius of the sound signal or within a particular room with the first device. If no such sound signal is detected by the other device, the server knows that the user is not within the predetermined area of the first device.

In other examples, other types of sensor systems can be used to locate the user. For example, a GPS sensor used on the portable device carried by the user can be used to locate the current geographical location of the user, and this location can be transmitted to the server. However, such a sensor may not provide enough accuracy to the sensed location in some implementations. Thus, the sound sensor system described above can be used in conjunction with GPS sensors on different portable devices to determine the location of the user. For example, if a sound-sensing portable device carried by the user is within range of a sound emitter on a different portable device carried by a different user, then the user's location may be better defined by using both the GPS signals from the user's portable device and from the different portable device. In another example, if the user's portable device is not using GPS but the different device is using GPS, the GPS signal on the different device can be used to locate the different user who is known to be located close to the user's device based on the sound sensor system. Other types of sensor systems can also or alternatively be used to locate the user, such as camera systems provided on the first device (or another device in communication with the server) used with person or object recognition of captured images, triangulation of device signals from a device worn by the user and sensed by wireless access points and/or other sensors (e.g., on the first device or in a location near to the first device, such as in a room that also holds the first device), local network proximity signals (e.g., Bluetooth), or other sensor systems using radio signals, optical signals, other electromagnetic signals, and/or acoustic signals.

In another example, the user can be carrying a portable device that can "pair" or register with the first device within a predetermined area of the first device. For example, the pairing can allow the devices to communicate with each other using the same signal frequency and/or other common communication parameters. While the portable device is within the predetermined area, the devices can remain paired. If the portable device is moved out of the predetermined area, the devices may become unpaired or unregistered. Upon such an unpairing, the first device and/or portable device can inform the server of the unpairing, thus locating the user outside the predetermined area. (Unpairing can also occur if one or both paired devices are turned off or their signal is otherwise interrupted. In some implementations, if desired, some causes of unpairing can be detected and distinguished from unpairing caused by physical distance, e.g., by checking whether the paired devices are still powered.) Some implementations can allow the paired portable device to stream the media content data to the first device, such that if the devices become unpaired, the stream of media content data is no longer sent to the first device.

If the user has moved outside a predetermined area of the first device as checked in block 308, then the method continues to block 312, described below. If the user not moved outside the predetermined area, then in block 310, the method checks whether the user has moved into a predetermined area of (e.g., relative to) a different output device from a location outside that predetermined area. This check is with respect to a different device that is not on the person of the user, since the user is always near portable devices on his or her person. In some implementations, if the user is detected to have moved into the different device area, it can signify that the user has stopped using the first device in favor of using the different device, whether or not the user has moved out of the first device area and/or regardless of the output state of the first device. In some other implementations, the user is not considered to have stopped using the first device if the user is still within the first device area (and is now in the different device area), and is considered to be using both first and different devices. For example, both first device and different device can be commanded to output the stream of media content data in such a case, in some implementations. The method can determine whether the user has moved into the predetermined area of the different device using any of various techniques and implementations. For example, the method can use a sound sensor system, GPS system, and/or other sensor systems similarly as described above for block 308. In one example, the method can check whether a portable device on the person of the user is sufficiently within range of a different device to pair or register with the different device, thus indicating that the user has moved into the predetermined area of the different device. For example, the portable device and/or the different device can inform the server of the pairing. In some implementations, this new pairing can cause the old pairing of the portable device with the first device to be disconnected.

If the user has not moved into a predetermined area of the different device, and the user has not otherwise been detected to have stopped using the first device for the content playback, then the method can return to block 304 to continue providing the stream of media content data to the first device for output by the first device. If the user has moved into the different device area in block 308, the method continues to block 312.

In block 312, the user is considered to have stopped using the first device for the content playback, and the method determines and stores a place marker for the media content data in available storage. For example, the place marker can indicate a portion of the media content data that was output by the first device approximately at the time of the indication that the user discontinued use of the media content playback of the first device (or approximately at the time of the detection of the indication, e.g., when a server or other system implementing block 312 received the indication and/or determined the discontinued use). For example, the place marker can indicate the particular frame of a video and/or the particular second of audio that was output from the first device at the time of the indication of non-use. This particular frame or other place can be approximate since there may be some uncertainty as to which portion was last output before the user disengaged, or which portion the user last experienced (or last experienced with reasonable attention to the content). Some implementations can place the marker at a point in the content data before the determined last output portion, e.g., a predetermined number of seconds before the last output portion, so that a small portion of the content data is repeated for the user if playback resumes from the place marker. In some examples, the place marker can be an indication of the time elapsed for the media content stream with reference to the beginning of the stream of data or the beginning of a work of content included in the stream. Alternatively, a counter value or similar indication can be used to indicate the output amount of content in the stream.

Some implementations can also cause the output of the media content stream on the first device to discontinue in response to determining that the user has stopped using the first device for playback of the content, e.g., the method can command the first device over the network to stop or pause the output. Other implementations can allow the output of the media content stream to continue by the first device to a later point until some other condition occurs, e.g., a predetermined time limit passes and/or the user is not detected within the predetermined area of the first device, etc. Such later output can be assumed to be not experienced by the user, or alternatively can be assumed to be experienced by the user such that an update to the place marker is stored after a condition occurs to cause the output to be discontinued.

In block 314, the method sends or "pushes" a notification to one or more notification devices to be output by the notification devices, where the notification includes a continue option for the media content stream. In some implementations, a notification device can be a portable device that is a personal device on the person of the user, such as a cell phone, tablet computer, wearable device, etc. For example, some implementations can designate the notification device to be the same portable device that may have been used for user proximity detection as described above in blocks 308 and 310. Some implementations can alternatively or additionally send the notification to one or more other devices for output, such as a non-portable device and/or one or more different devices that will potentially continue the output of the stream of media content data as described below (e.g., if such a non-portable and/or different device is detected as available for use as described below). The notification can be sent over the Internet and/or over one or more local networks to each notification device. In some implementations, the notification can be generated and sent by the first device directly to one or more notification devices over a local network and/or Internet, instead of involving connections to a server as described above. Some implementations can generate and send the notification from a server implementing method 300 (or portions thereof) over the Internet and/or other network to the notification device.

In one example, the notification can be a displayed (visual), audio, and/or otherwise output message telling the user that a continuation of playback of the stream of media content is available if the user selects a displayed continue option, such as a displayed button, link, or other physical or displayed control of the notification device (and/or control of another device). The notification device can output the notification using any of various components of the device, e.g., display the notification on a display screen, output the notification from one or more audio speakers, output haptic feedback using one or more actuators, etc. Other implementations can allow any input command of the user to select the continue option, such as a voice command received from a microphone of the device, motion command (e.g., moving the entire portable device in a particular gesture, etc., sensed by motion sensors of the device such as accelerometers and/or gyroscopes), screen-gesture command sensed by a touchscreen of the device, or command received by other type of user input. Some implementations can present additional or alternative information to the user in the notification, e.g., based on the stream of media content data and characteristics of its playback and discontinued use of the first device. For example, the notification can include descriptive information such as a title of the streamed media content (e.g., title of movie, video, song, album), artist of the content, and/or other information relating to the streamed media content data. This information can be retrieved from the stream source and/or can be embedded in the stream data. Some implementations can display a video frame of the last (approximate) scene viewed by the user before the user discontinued use of the first device, the last scene viewed of a game that was being played by the user on the first device (and statuses of players in the game at that time), an image of a cover of a music or voice album that was played, a cover of a book or other text work that was displayed, and/or other information. Some implementations can display an indication of time expired for the media content, e.g., how far through a work of content included in the media stream that the output progressed before the user discontinued use of the media content playback from the first device. Some implementations can also output a predetermined associated message or other indication of the condition(s) that caused the method to conclude that the user was no longer using the first device for the content playback, e.g., a message such as "you paused the movie," "you moved away from the presentation on the television," or "you moved into a different room than the television."

In some implementations, the notification can be output by the notification device only if predetermined conditions have been fulfilled. Such conditions can be specified by the user in preferences stored in storage (e.g., memory or other storage) of the notification device and/or in a user account of a server, in some implementations. For example, such conditions can include time of day or other designated time period, subject matter of the media content (e.g., category, genre, type, authors, actors/presenters, etc.), conflicts with other events on the user's calendar stored on the portable device or an accessible server, etc. In some examples, a notification can be output by the notification device in response to the media content data being of particular type or genre of media content (e.g., episodes of particular family-oriented TV series) and/or if particular persons are present with the user (e.g., particular family members) which can be known by the method, for example, by detecting the other persons' on-person devices (e.g., GPS or cellular device locator systems on cell phones, wearable devices, etc.) or detecting their proximity through a sensor system such as the sound sensor system described above. Some implementations can omit the sending of the notification and the providing of the continue option, e.g., automatically continue the playback on a second device as described below.

In block 316, the method checks whether there are one or more different devices being used by the user or otherwise available for continuation of the output of the stream of media content data. A "different device" as referred to in block 316 is a media content output device that is different and separate from the first device as well as different and separate from a notification device that received the notification in block 314 (if any). In one example, if the first device is a device not located on the person of the user and the notification device is a portable or personal device located on the person of the user, the different device can be another device not located on the person of the user. In other implementations, a different device can be located on the person of the user while a separate notification device receives the notification on the person of the user (or, the notification device is a non-portable device).

For example, in some implementations, the method can check whether the user has physically moved into a predetermined area of a different device suitable for media content output. This condition may previously have been checked in blocks such as block 310 (and/or in block 314 for a notification device), but if not previously checked or if conditions warrant a re-check (e.g., user has moved a predetermined distance or predetermined time has passed since the last check), such a check can performed for block 316. In some implementations, if the user has moved into such an area of a different device, then the different device can be considered available to receive and output the media content stream (assuming the different device is capable of and ready to perform such tasks). In other implementations, such a different device may not be considered available unless the user is actually using the different device, e.g., sending one or more commands to the different device with a portable device or other device (e.g., a remote control, instrument panel on the different device, etc.). Some implementations can send a notification to the user (e.g., via a notification device and/or the different device) that lists available different devices and/or a request to the user to approve or disapprove one or more proposed different (and/or notification) devices for continuation of the output, or include such information and/or request in the notification of block 314. In such examples, each different device can be considered not available for output of the media content data unless approved by the user.

If there are no used or available different devices found in block 316, then the method continues to block 318 in which the method causes the media content buffer data to be sent from the first device to the notification device over a local network. For example, the notification device can be a portable device on the person of the user and having one or more display screens to output the media content data. The streamed content data that is still in the buffer of the first device typically was ready to be output next by the first device but was not yet output by the first device, and this can be the first media content data to be output by the notification device in a continuation of the first device's output. Some implementations can have the first device retain the last portion (e.g., predetermined number of seconds) of the content data output by the first device (before disengagement by the user) in its memory or other storage, to be placed at the beginning of the buffered data; this allows this portion of content to be re-output by the notification device. The buffered data can be sent over a local network such as a wireless local network (e.g., Wi-Fi or peer-to-peer wireless network) and/or local wired network (e.g., Ethernet) that in many cases can be much faster to transmit the data than receiving the streamed data over the Internet from the stream source. The method then continues to block 322, described below.

If there are one or more different devices available to continue the output of the content data in block 316, then the method continues to block 320 in which the method causes the media content buffer data to be sent from the first device to the different device over a local network. This can be similar to block 318 except that the content data that is still in the buffer of the first device can be sent directly to the different device over one or more local networks. The method then continues to block 322, described below. In some implementations, one or more user devices such as a notification device, other portable device, or non-portable device can register or pair with the different device to allow control over the output of the different device using controls of the user device. Some implementations can cause the first device to send its buffered data to both the different device and the user device(s), e.g., over a local network if possible, if the user devices are available. For both blocks 318 and 320, some implementations can send the buffered data to the different device and/or user device only if approval is received by the user, and/or if all user conditions on the notification and playback continuation are met.

If there is no device available for continuation of the media stream output, then in some implementations the method can continually check block 316. In some implementations, the first device can be considered a "different device" if it has discontinued the media content stream output, and so can continue the output of the stream if conditions allow. In some implementations, blocks 316-320 can be performed by the method while the notification of block 314 is being sent and/or displayed and before the user has selected a continue option. This can allow the stream media content data to be buffered on the continuation playback device(s) before the stream needs to be output by those devices.

In block 322, the method checks whether the user has selected the continue option provided with the notification (or the user has otherwise commanded the continuation of output of the media content data). If not, the method can continue to check for such a selection (and/or can respond to other events such as the user moving out of the predetermined area of the different device, the user un-pausing content output on the first device, providing other commands, continue buffering data on the second device, etc.). If the user has selected a continue option, then in block 324 the method commands the stream of media content data to be output on the second (e.g., next) device starting at the place marker and starting with the received buffered content data. The method can send an indication of the place marker to the second device over a connected network, if needed, or can command the first device to send the place marker with the buffered data to the second device, e.g., over a local network or Internet. The "second device" that continues output of the media content data can be a notification device described above if no available different device was found, or can be one or more different devices as described above. For example, if the second device is a different device and the user also has access to a user device (e.g., portable device or other accessible device), then the user device can receive the notification of block 314 as an intermediary device that also receives a selection of the user to continue playback. The intermediary device thus can enable the playback of the stream of content media data to be continued on a device different than the intermediary device. In some implementations, the intermediary device can be portable and easily accessed and operated by the user, and allows easy selection by the user to continue the media content playback on a different device. Some implementations can command the stream of content data to be output on both the notification device and the different device.

In block 326, the method commands the stream of media content data to be sent to and received by the second device to continue the output of the stream of media content data received from the stream source. Since the buffered content data received from the first device will typically not include all of the remaining data from the stream of media content data, the second device receives the remaining data of the stream from the stream source, e.g., over the Internet. For example, the second output device (or a server running method 300) can send an indication to the stream source of the starting point in the stream that is required by the second output device after the end of the buffered content data, where this starting point can be tracked by the first device and sent to the second device via a local network or Internet. In some examples, the streamed data can be requested and/or started to be received by the second device immediately after the buffered content data is started to be output, so that streamed content data can fill the buffer of the second device while previously-buffered data is being emptied for output. The stream source providing the data to the second device can be the same stream source used by the first device, or a different stream source (e.g., different media content server, different client device, etc.). In some implementations, the second device can receive the stream of media content data from a local device, such as a portable device on the person of the user over a local network such as a wireless local network (e.g., Wi-Fi) or peer-to-peer network between the devices (e.g., Wi-Fi Direct, Bluetooth, etc.). The local device can, in some implementations, receive the stream of data from a stream source over the Internet, for example.

Thus, the media content data can be transferred to and output on a different device from the device previously outputting the content data, and from a place in the content data that continues the playback relative to the previous output. This continuation of media content playback on a different device can be performed without the user having to perform manual tasks to enable the continuation of playback. For example, the user does not need to log into a user account of a media service (e.g., enabling the downloading of media content over the Internet from a media server to a client device) for accessing the media server from the second device to cause playback on the second device. Similarly, the user does not need to manually navigate a user interface displayed on the second device nor navigate through a collection of content items to manually select the particular media content that was playing on the first device which the user wishes to continue playing on the second device. The selection of the media content and the playback on the second device is automatically performed. Furthermore, the user's desire for continuation of the content data on a different device can be inferred from user behavior, such as movement away from the first device and/or movement closer to the second device. In addition, features such as sending buffered media content data from the first device to the second device over a local network allows the continuation of content output to be quickly and smoothly transitioned to the second device and reduces redundant and/or possibly costly re-downloading of content data over the Internet that was previously downloaded on the first device.

Variations of the described features can be implemented. For example, some implementations can allow a user to set different priorities to different devices, such that the method will select the output device of highest priority that is available (and with usable range of the user) to continue the output of the stream of media content data. Some implementations can allow the user to set other conditions that may cause the selection of one available device over other devices for the continuation of media content playback. Some implementations can allow a device, such as the first device, to receive and buffer (or otherwise store) a complete and entire stream of media content data (e.g., for a particular work of content) and to send the complete set of data to the second device over the local network instead of just a buffered portion. In various implementations using a portable device, a single portable device on the person of the user can perform or contribute to many of the functions described above, such as user location or proximity detection, pairing with different devices, output of notifications, control of a different device, sending of the media content stream to the first device and/or a different device, and/or continuing the output of the media content stream from the first device. Or, some or all of these functions can be divided in whole or in part among multiple portable devices and/or non-portable devices.

Various blocks and operations of methods 200 and 300 can be performed in a different order than shown and/or at least partially simultaneously, where appropriate. For example, some implementations can perform blocks of the methods at various times and/or based on events not related to those described. In some implementations, blocks or operations of methods 200 and 300 can occur multiple times, in a different order, and/or at different times in the methods. In some implementations, the methods 200 and/or 300 can be implemented, for example, on a server system 102 as shown in FIG. 1. In some implementations, one or more client devices can perform one or more blocks of these methods instead of or in addition to a server system performing one or more blocks.

Figure 4A:
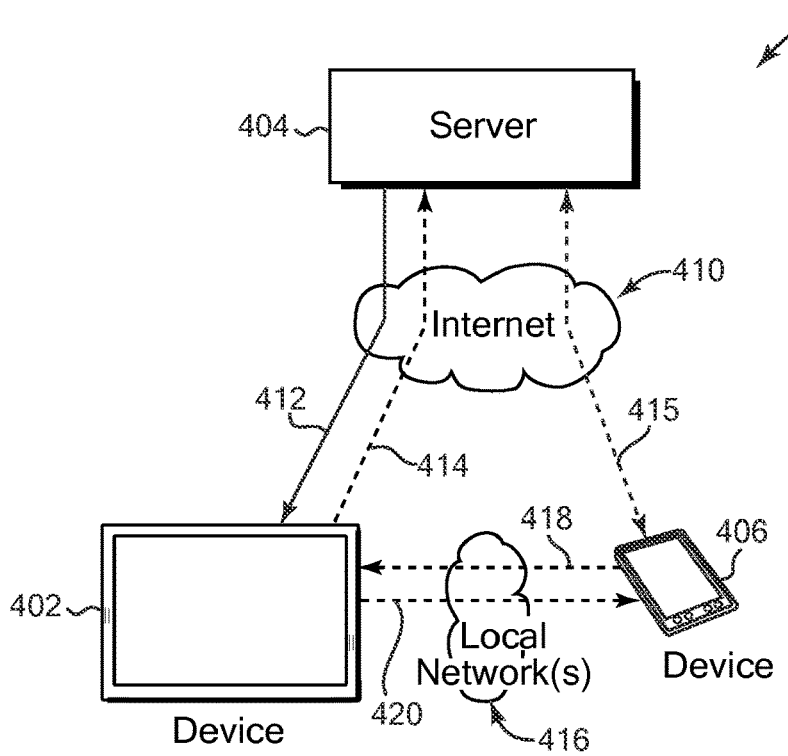
FIGS. 4A-4C are diagrammatic illustrations of examples of systems including some features described herein.
Figure 4B:
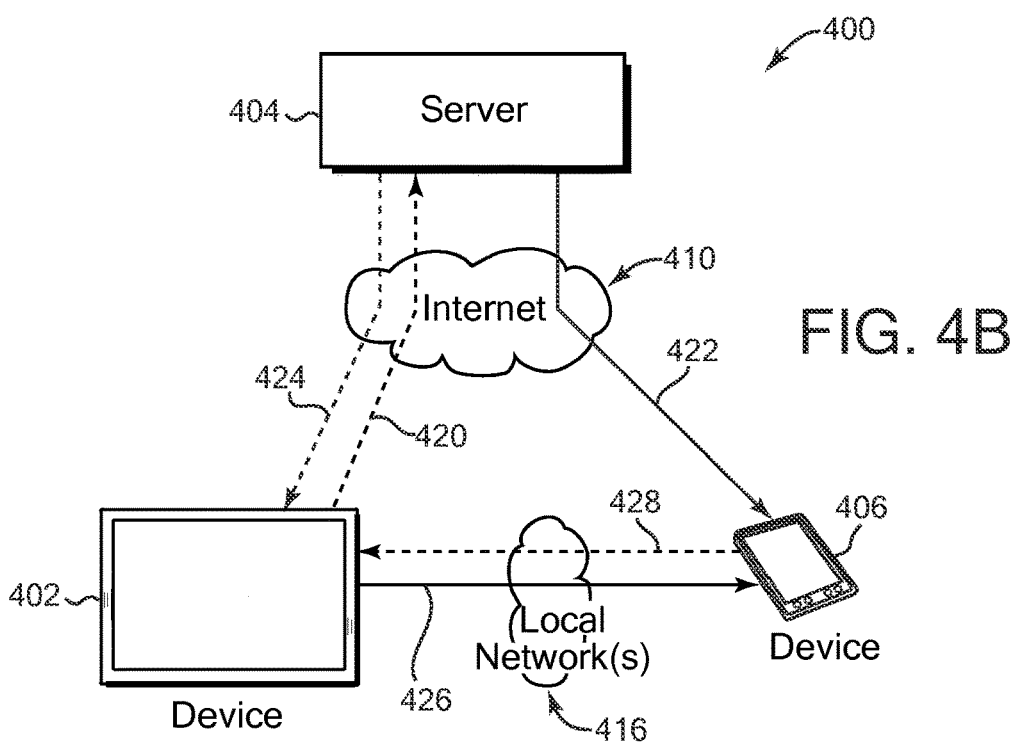
Figure 4C:
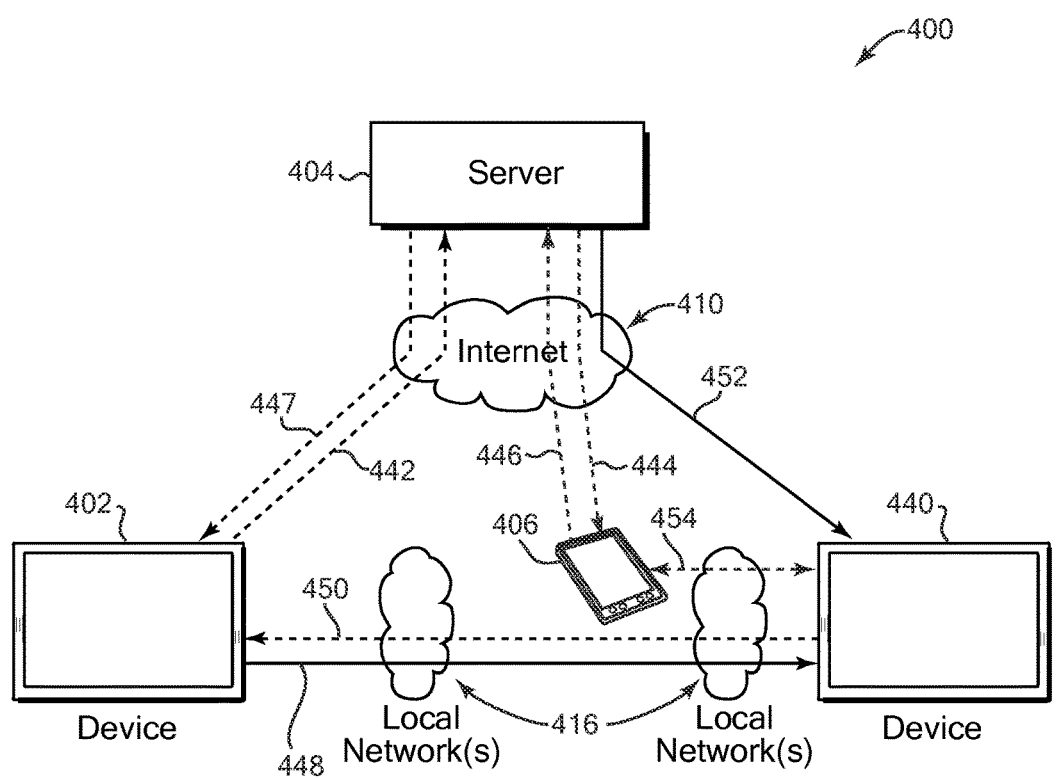

FIGS. 4A-4C are block diagrams illustrating example implementations including one or more features described herein. In general, the FIGS. 4A-4C illustrate examples of directional flow of data between various components, and not necessarily actual connections between components.

FIG. 4A illustrates an example system 400 that can provide features of continuing playback of media content data on different devices. System 400 includes a device 402, a server 404, and optionally a device 406. In this example, device 402 can be a first device as described above with reference to FIGS. 2 and 3. For example, device 402 can be a television, desktop computer, laptop computer, or other display device that is not on the person of the user and can be typically stationary in a particular location such as a room of a building. Server 404 can be a media server that stores media content data and can stream the content data to devices over Internet 410.

In this example, the device 402 streams media content data from the server 404 over the Internet 410, as indicated by path 412. (In some implementations the devices 402, 406, and 422 can communicate with the Internet 410 over a local network connected between the devices and the Internet, which is not shown.) The device 402 buffers and outputs the received media content data, e.g., by displaying images on a display screen, outputting audio from speakers, etc. In some implementations, the device 402 can send information to server 404 over the Internet 410 as indicated by path 414, such as status information regarding one or more states and settings of the device 402, regarding the output of the stream of media content data, etc.

A device 406 can be used by the user in some implementations. For example, device 406 can be a personal and/or portable device, such as a cell phone, tablet computer, or wearable device. Device 406 can communicate with the server 402 via the Internet 410 and one or more other networks (cell phone networks, etc.) over a path 415. Some implementations can allow the user to interface with and/or operate device 406, e.g., to send commands to the device 402. For example, the device 406 can pair or otherwise link with device 402 over one or more local networks 416, such as a wireless local network, peer-to-peer network, Internet 410, etc. The device 406 can send commands or requests to the device 406 on a path 418. Such commands can include commands to manipulate the output of the media content data on device 402, such as stopping, pausing, forwarding, rewinding, etc. In some implementations, the device 402 can send information to device 406 over local network 416 (and/or Internet 410), such as status information, etc., on a path 420. In some implementations, the device 406 can receive the stream of media content data from the server 404 and can relay that stream of data to the device 402 over one or more local networks.

FIG. 4B illustrates one example of system 400 providing continued media content output on different devices. FIG. 4B illustrates example implementations in which the output of media content data is transferred to and continued on a portable device of the user that is also used as a notification device.

After the configuration of FIG. 4A has been operating, the system 400 receives an indication that the user has stopped using the device 402 for output of the stream of media content data. For example, the user may have commanded the device 402 to stop the output, or the user may have moved out of a predetermined area of the device 402, such as moving out of a room in which the device 402 is located or out of pairing range between devices 402 and 406, as described with reference to FIG. 3. In some implementations, after receiving this indication of discontinued use of the playback function of the device 402 by the user, the server 402 can stop the stream of media content data sent to and/or output by the device 402 if it has not already stopped. In some implementations, the device 402 can send a status indication to the server 404 on path 420 to indicate the discontinued use of the content data output.

The server 404 determines that there is no different device available for continuing the output of the stream of media content data, and thus selects the device 406. The server 404 sends a notification to the device 406 on path 422 to be displayed to the user, including an option (such as a displayed button) to continue output of the stream of media content data on the device 406. If the user selects the option to accept continuation of playback, the device 402 is instructed by the server 404 on path 424 to send buffered data of the stream of media content to the device 406 over one or more local networks 416, as indicated by path 426. In some implementations, the device 402 can also send to device 406 the identification of the content being output (e.g., so the device 406 knows which stream to request from the server) and/or the place marker indicating the playback progress (or such information can be sent from the server 404). The device 402 can locate the device 406 over its connection to the local network 416, such as a wireless local network, despite being unpaired with the device 406 (e.g., the unpairing can disconnect a peer-to-peer network or other connection). In some implementations, the device 406 can communicate responses, status, commands, or requests over the local network on path 428 to device 402.

After the buffered data has been received at device 406 on path 426, the server 404 can start the sending of the stream of media content data to device 406 over the Internet on path 422. The sending of the stream can start at the data in the stream following the buffered data sent by device 402. Thus, the device 406 can continue the output of the media content stream seamlessly by first outputting the buffered data from device 402, followed by the stream of data received from server 404. In some implementations, if the method detects the user starting to use the first device again for content playback, another notification can be sent (or the notification can be omitted) and content output transferred back to the device 402 from the device 406.

FIG. 4C is illustrates another example of system 400 continuing media content output on different devices. FIG. 4C illustrates implementations in which the output of media content data is transferred to and continued on a different device other than a portable device used for notifications, and the portable device is used as an intermediary device.

After the configuration of FIG. 4A has been operating, the system 400 receives an indication that the user has stopped using the device 402 for output of the stream of media content data. For example, any of the indications described above can be detected. In one example, the user is detected to move into a predetermined area of a different device 440, e.g., where the detection is performed using a sound sensor system or other sensor system as described above, or a new pairing of the device 406 with the device 440 is detected. In some implementations, this causes the server 404 to determine that the user no longer desires to experience the content data output from first device 402, and desires to experience it being output from device 440. In some implementations, after receiving this indication of discontinued use of the playback function of the device 402 by the user, the server 404 can stop the stream of media content data to the device 402 if it has not already stopped, and/or can unpair the device 406 with the device 402. In some implementations, the device 402 can send a status indication to the server 404 on path 442 to indicate the discontinued use of the content data output by the user, and an identifier of the content and place marker indicating the output progress of the stream, if needed.

The server 404 determines that there is a different device 440 available for continuing the output of the stream of media content data (other than the device 406). For example, the server 404 may have detected that the user has moved within a predetermined area associated with the device 440, e.g., using a sensor system or pairing with device 406 as described above. The server can also try to determine the state of the device 440 to determine whether it is available for continuing media content output, e.g., whether it is powered on, in a state to receive and output content data, etc. In some implementations, the server can sense the device 440 that may be in a sleep mode, and can wake up the device 440 with the appropriate signal provided via Internet 410 and/or local network 416. The device 440 becomes a second device referred to above. In one example, the device 440 can be a non-portable device such as a television or other device with a large display screen.

In some implementations in which the user has a portable device 406, the server 404 sends a notification to the device 406 on path 444 to be displayed to the user, including an option to continue output of the stream of media content data on the device 440. If the user selects the option to accept continuation of the output by device 440, the device 406 can send a signal on path 446 to server 404 to indicate this user selection. Thus device 406 is used as an intermediary device. The server 404 can command the device 402 over path 447 to send its buffered data from the stream of content data to the device 440 over the local network 416, e.g., over path 448. In some implementations, the device 402 can also send to device 440 the identification of the content being output (e.g., so the device 440 knows which stream to request from the server) and/or the place marker indicating the playback progress (or such information can be sent from the server 404). The device 402 can locate the device 406 and device 440 over its connection to the local network 416, such as a wireless local network. In some implementations, the device 440 can communicate responses, status, commands, and/or requests over the local network on path 450 to device 402.

After the buffered data has been received at device 440 on path 448, the server 404 can start sending the stream of media content data to device 440 over the Internet on path 452. The sending of the stream can start at the data in the stream following the buffered data sent by device 402. Thus, the device 440 can continue the output of the media content stream seamlessly by first outputting the buffered data from device 402, followed by the stream of data received from server 404. In some implementations, the portable device 406 can pair or register with device 440 and send (and/or receive) commands, status, or other signals to control or inform the device 440, e.g., over the local network on path 454 or over some other path, similarly as described above for device 402 in FIG. 4A.

In some implementations, the server can send the notification to the device 440 instead of or in addition to device 406. For example, in some implementations the user does not have device 406 or it is not able to function with the other devices as described herein, in which case the notification can be displayed by device 440. In still other implementations, no notification is sent to any device and the device 440 is commanded to continue output of the media content data automatically once the user is detected to stop use of the first device content playback and/or the user is within the predetermined area of the second device. In one example, the user can set a mode for devices 404, 402 and 440 to allow such automatic transfer and continuation of media content data without requiring user acceptance of the continuation of playback, such that the devices can detect the user's location and the playback of the media content data can automatically "follow" the user as the user moves from any output device to any other output device.

In some implementations, a chain of devices can become the second device and then the first device in turn. For example, the user moves away from a first device such as a desktop computer playing the media content, at which point a portable device on the person of the user continues playback of the media content as the second device. The user moves into a predetermined area of a different device such as a television, at which point the portable device becomes the first device and the television becomes the second device that continues the media content stream playback from the place marker left by the portable device. The user moves away from the television, at which point the portable device again becomes the second device, and the user moves into range of another output device, which then becomes the second device, and so on.

In some implementations, any of the devices can perform commanding and other tasks of the server described in the methods and examples above. For example, a portable device such as device 406 can perform such tasks, e.g., receive the place marker indicating the output progress as well as the identifier for the content data that was being output on the first device such as device 402, and control the continuation of the playback on the second device 440 by instructing the server 404 and device 440 as needed.

Figure 5:
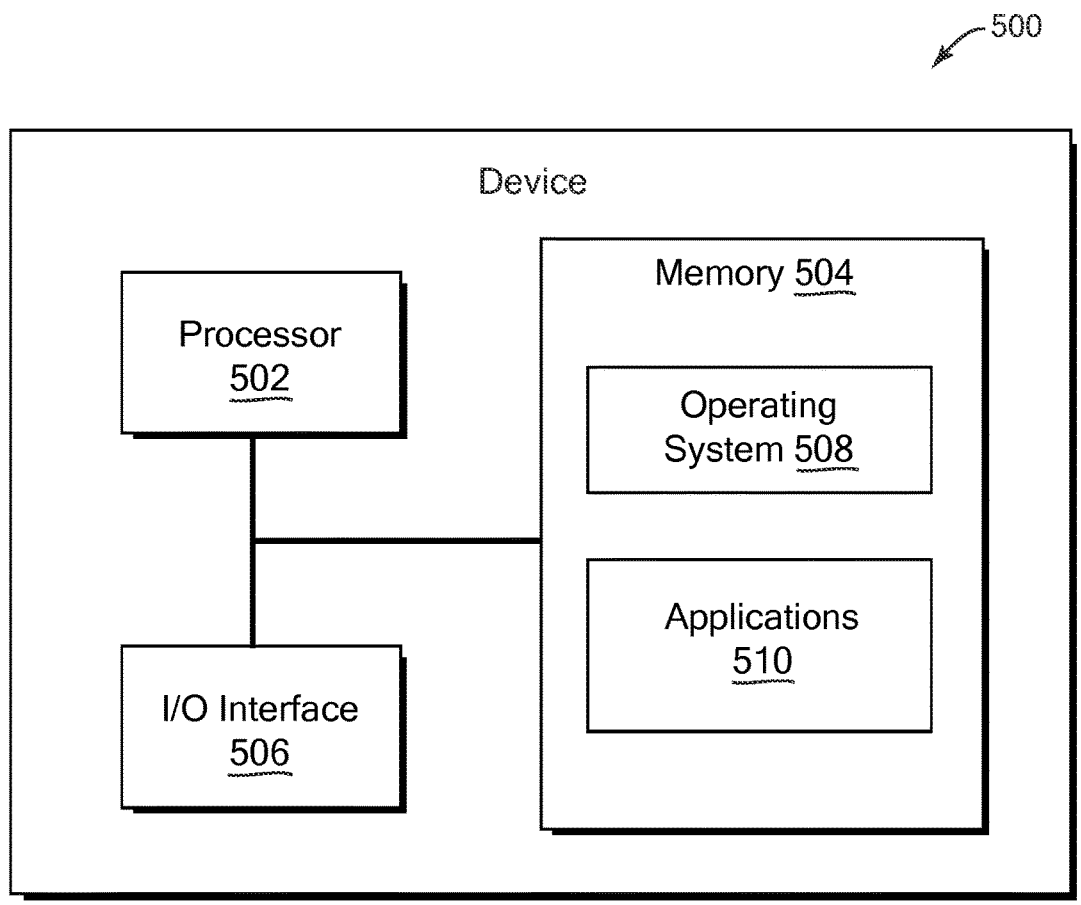
FIG. 5 is a block diagram of an example device which may be used for one or more implementations described herein.

FIG. 5 is a block diagram of an example device 500 which may be used to implement one or more features described herein. In one example, device 500 may be used to implement server device 104 of FIG. 1, and perform appropriate method implementations described herein. Device 500 can be any suitable computer system, server, or other electronic or hardware device. For example, the device 500 can be a mainframe computer, desktop computer, workstation, portable computer, or electronic device (portable device, cell phone, smart phone, tablet computer, television, TV set top box, personal digital assistant (PDA), media player, game device, wearable device, etc.). In some implementations, device 500 includes a processor 502, a memory 504, and input/output (I/O) interface 506.

Processor 502 can be one or more processors or processing circuits to execute program code and control basic operations of the device 500. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 504 is typically provided in device 500 for access by the processor 502, and may be any suitable processor-readable storage medium, such as random access memory (RAM), read-only memory (ROM), Electrical Erasable Read-only Memory (EEPROM), Flash memory, etc., suitable for storing instructions for execution by the processor, and located separate from processor 502 and/or integrated therewith. Memory 504 can store software operating on the device 500 by the processor 502, including an operating system 508 and one or more applications engines 510 such as a graphics editing engine, web hosting engine, social networking engine, media content server engine, etc. In some implementations, the applications engines 510 can include instructions that enable processor 502 to perform the functions described herein, e.g., some or all of the methods of FIGS. 2-3. Any of software in memory 504 can alternatively be stored on any other suitable storage location or computer-readable medium. In addition, memory 504 (and/or other connected storage device(s)) can buffer and/or store media content data and instructions and/or other data used in the features described herein. Memory 504 and any other type of storage (magnetic disk, optical disk, magnetic tape, or other tangible media) can be considered "storage devices."

I/O interface 506 can provide functions to enable interfacing the device 500 with other systems and devices. For example, network communication devices, storage devices such as memory and/or database 106, and input/output devices can communicate via interface 506. In some implementations, the I/O interface can connect to interface devices such as input devices (keyboard, pointing device, touchscreen, microphone, camera, scanner, etc.) and output devices (display device, speaker devices, printer, motor, etc.).

For ease of illustration, FIG. 5 shows one block for each of processor 502, memory 504, I/O interface 506, and software blocks 508 and 510. These blocks may represent one or more processors or processing circuitries, operating systems, memories, I/O interfaces, applications, and/or software modules. In other implementations, device 500 may not have all of the components shown and/or may have other elements including other types of elements instead of, or in addition to, those shown herein. While system 102 is described as performing steps as described in some implementations herein, any suitable component or combination of components of system 102 or similar system, or any suitable processor or processors associated with such a system, may perform the steps described.

A client device can also implement and/or be used with features described herein, such as client devices 120-126 shown in FIG. 1. Example client devices can include some similar components as the device 500, such as processor(s) 502, memory 504, and I/O interface 506. An operating system, software and applications suitable for the client device can be provided in memory and used by the processor, such as network communication driver and/or application software, sensor system software, etc. The I/O interface for a client device can be connected to network communication devices, as well as to input and output devices such as a microphone for capturing sound, a camera for capturing images or video, audio speaker devices and sound emitters for outputting sound, a display device for outputting images or video, a touchscreen for capturing touch input on a display screen, actuators for providing haptic output, or other output devices. A display device, for example, can be used to display the images and other data as described herein, where such device can include any suitable display device such as an LCD, LED, or plasma display screen, CRT, television, monitor, touchscreen, 3-D display screen, or other visual display device. Some implementations can provide an audio output device, for media content output and other output such as voice output or synthesis that speaks text and/or describes settings, notifications, and permissions.

Although the description has been described with respect to particular implementations thereof, these particular implementations are merely illustrative, and not restrictive. Concepts illustrated in the examples may be applied to other examples and implementations.

In situations in which the systems discussed here may collect personal information about users, or may make use of personal information, users may be provided with an opportunity to control whether programs or features collect user information (e.g., images depicting the user, information about a user's social network, user characteristics (age, gender, profession, etc.), social actions or activities, a user's preferences, or a user's current location). In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, a user may have control over how information is collected about the user and used by a server.

Note that the functional blocks, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed such as procedural or object-oriented. The routines may execute on a single processing device or multiple processors. Although the steps, operations, or computations may be presented in a specific order, the order may be changed in different particular implementations. In some implementations, multiple steps or blocks shown as sequential in this specification may be performed at the same time.

What is claimed is:

1. A method comprising:

causing a stream of media content data to be received by a first device over a network from a stream source and output by the first device, wherein a buffered portion of the stream of media content data is buffered on the first device before being output;

receiving, at a server, an indication of a change of use of the first device with respect to the output of the stream of media content data;

determining a place marker for the stream of media content data indicating a portion of the stream of media content data that is output approximately at a time of the indication; and causing the stream of media content data to be received and output by a second device, wherein the output starts at the portion of the stream of media content data indicated by the place marker, wherein the buffered portion of the stream of media content data on the first device is sent, in response to a command of the server, from the first device to the second device for output by the second device before output of an unbuffered portion of the stream of media content data received by the second device, wherein the unbuffered portion is provided by the stream source.

2. The method of claim 1, further comprising:
determining whether the second device is available to receive the stream of media content data, wherein causing the stream of media content data to be received and output by a second device is performed in response to determining that the second device is available to receive the stream of media content data.

3. The method of claim 2, wherein in response to determining that the second device is not available to receive the stream of media content data, causing the stream of media content data to be received and output by a device different than the first device and the second device.

4. The method of claim 1, wherein after causing the stream of media content data to be received and output by the second device, continuing to cause the stream of media content data to be received and output by the first device until at least one of: a predetermined time limit expires, and a user of the first device is not detected within a predetermined area of the first device.

5. The method of claim 1 wherein the stream of media content data is retrieved by the first device and by the second device over the Internet from one or more servers as the stream source, and wherein the buffered portion of the stream of media content data is sent to the second device over a network local to the first device and the second device.

6. The method of claim 1 wherein detecting the indication of the change of use of the first device with respect to the output of the stream of media content data includes detecting that a user of the first device has physically moved outside a predetermined area associated with the first device.

7. The method of claim 6 wherein detecting that the user has physically moved includes using a sound detection system including one or more components on the first device and one or more components on a device located on the person of the user.

8. The method of claim 6 wherein detecting that the user has physically moved includes detecting a communication unpairing of the first device with a device that is located on the person of the user.

9. The method of claim 6 wherein detecting that the user has physically moved is based on a third device that is located on the person of the user, and further comprising causing a notification to be sent to the third device, wherein the notification is output by the third device and provides a continue option selectable by the user, wherein the output of the stream of media content data by the second device is performed in response to receiving a selection of the continue option.

10. The method of claim 1 wherein the first device is not located on the person of a user of the first device and the second device is a portable device located on the person of the user.

11. The method of claim 1 wherein the first device and the second device are not located on the person of a user of the first device.

12. The method of claim 1 further comprising causing a notification to be sent to a third device, wherein the notification is output by the third device and provides a list of one or more devices, including the second device, that are available to receive the stream of media content data.

13. The method of claim 1 further comprising causing a notification to be sent to the second device, wherein the notification is output by the second device and provides a continue option selectable by a user, wherein the sending of the buffered portion of the stream of media content data from the first device to the second device and the output of the stream of media content data by the second device are performed in response to receiving a selection of the continue option.

14. A system comprising:
a storage device; and
at least one processor accessing the storage device and configured to perform operations comprising:
causing a stream of media content data to be received by a first device over a network from a stream source and output by the first device, wherein a buffered portion of the stream of media content data is buffered on the first device before being output;
receiving, at a server, an indication that use of the first device has stopped with respect to the output of the stream of media content data;
determining a place marker for the stream of media content data indicating a portion of the stream of media content data that is output approximately at a time of the indication; and
causing the stream of media content data to be received and output by a second device, wherein the output starts at the portion of the stream of media content data indicated by the place marker,
wherein the buffered portion of the stream of media content data on the first device is sent, in response to a command of the server, from the first device to the second device for output by the second device before output of an unbuffered portion of the stream of media content data received by the second device, wherein the unbuffered portion is provided by the stream source.

15. The system of claim 14 wherein the at least one processor is configured to perform operations further comprising determining whether the second device is available to receive the stream of media content data, wherein the operation of causing the stream of media content data to be received and output by a second device is performed in response to determining that the second device is available to receive the stream of media content data, and
wherein in response to determining that the second device is not available to receive the stream of media content data, causing the stream of media content data to be received and output by a device different than the first device and the second device.

16. The system of claim 14 wherein the at least one processor is configured to detect the indication that use of the first device has stopped with respect to the output of the stream of media content data by detecting that a user of the first device has physically moved outside a predetermined area associated with the first device, including one of:
using a sound detection system including one or more components on the first device and one or more components on a device located on the person of the user; and
detecting a communication unpairing of the first device with a device that is located on the person of the user.

17. The system of claim 14 wherein the at least one processor is configured to perform operations further comprising causing a notification to be sent to a third device, wherein the notification is output by the third device and provides a list of one or more devices, including the second device, that are available to receive the stream of media content data.

18. The system of claim 14 wherein the at least one processor is configured to perform operations further comprising causing a notification to be sent to the second device, wherein the notification is output by the second device and provides a continue option selectable by a user, wherein the sending of the buffered portion of the stream of media content data from the first device to the second device and the output of the stream of media content data by the second device are performed in response to receiving a selection of the continue option.

19. The system of claim 14 wherein the at least one processor is configured to detect the indication that use of the first device has stopped with respect to the output of the stream of media content data by detecting that a user of the first device has physically moved outside a predetermined area associated with the first device based on a third device that is located on the person of the user, and wherein the at least one processor is configured to perform operations further comprising causing a notification to be sent to the third device, wherein the notification is output by the third device and provides a continue option selectable by the user, wherein the output of the stream of media content data by the second device is performed in response to receiving a selection of the continue option.

20. A non-transitory computer readable medium having stored thereon software instructions that, when executed by a processor, cause the processor to perform operations including:

causing a stream of media content data to be received by a first device over a network from a stream source and output by the first device, wherein a buffered portion of the stream of media content data is buffered on the first device before being output;

receiving, at a server, an indication that a user of the first device has physically moved outside a predetermined area associated with the first device;

determining a place marker for the stream of media content data indicating a portion of the stream of media content data that is output approximately at a time of the indication; and causing the stream of media content data to be received and output by a second device, wherein the output starts at the portion of the stream of media content data indicated by the place marker, wherein the buffered portion of the stream of media content data on the first device is sent, in response to a command of the server, from the first device to the second device for output by the second device before output of an unbuffered portion of the stream of media content data received by the second device, wherein the unbuffered portion is provided by the stream source.

* * * * *